(12) United States Patent
Levow et al.

(10) Patent No.: US 8,849,836 B2
(45) Date of Patent: Sep. 30, 2014

(54) METHOD FOR MEASURING SIMILARITY OF DIVERSE BINARY OBJECTS COMPRISING BIT PATTERNS

(71) Applicant: Barracuda Networks Inc., Campbell, CA (US)

(72) Inventors: Zachary Levow, Camas, WA (US); Kevin Chang, Cupertino, CA (US)

(73) Assignee: Barracuda Networks, Inc., Campbell, CA (US)

( * ) Notice: Subject to any disclaimer, the term of this patent is extended or adjusted under 35 U.S.C. 154(b) by 38 days.

(21) Appl. No.: 13/682,714

(22) Filed: Nov. 20, 2012

(65) Prior Publication Data

US 2013/0097195 A1    Apr. 18, 2013

Related U.S. Application Data

(62) Division of application No. 12/839,307, filed on Jul. 20, 2010, now Pat. No. 8,463,797.

(51) Int. Cl.
*G06F 17/30* (2006.01)
*G06F 21/56* (2013.01)

(52) U.S. Cl.
CPC ........ *G06F 17/30386* (2013.01); *G06F 21/564* (2013.01)

USPC ............ 707/749; 707/690; 707/701; 707/758

(58) Field of Classification Search
CPC ............ G06F 17/30985; G06F 21/564; G06F 17/30495; G06F 17/30097
USPC .................................. 707/749, 690, 701, 758
See application file for complete search history.

(56) References Cited

U.S. PATENT DOCUMENTS

| | | |
|---|---|---|
| 7,565,348 B1 * | 7/2009 | Waldin et al. ........................ 1/1 |
| 8,150,858 B2 * | 4/2012 | Perronnin et al. ............ 707/748 |
| 8,312,051 B2 * | 11/2012 | Jiang et al. ..................... 707/797 |
| 8,694,514 B2 * | 4/2014 | Frieden et al. ................ 707/749 |
| 2009/0204636 A1 * | 8/2009 | Li et al. ..................... 707/103 Y |
| 2010/0250480 A1 * | 9/2010 | Cherkasova et al. ............ 706/47 |
| 2012/0271827 A1 * | 10/2012 | Merz .............................. 707/737 |
| 2014/0019498 A1 * | 1/2014 | Cidon et al. .................. 707/827 |

* cited by examiner

*Primary Examiner* — Thanh-Ha Dang
(74) *Attorney, Agent, or Firm* — Duane Morris LLP

(57) ABSTRACT

An apparatus, system, and method for measuring the similarity of binary objects is disclosed. The method determines at least one pattern signature in an Nth binary object, accessing a location in a similarity store which has object identifiers for each of the previous N–1 binary objects which contain the corresponding pattern, and writing the object identifier of the Nth binary object at that same location in the similarity store. Reporting the number of locations in similarity store which contain the object identifiers of two apparently diverse binary objects is a measure of similarity to each other.

12 Claims, 5 Drawing Sheets

METHOD FOR MEASURING SIMILARITY OF DIVERSE BINARY OBJECTS COMPRISING BIT PATTERNS

BACKGROUND

This is a division application of application Ser. No. 12/839,307 filed 2010 Jul. 20 which is incorporated in its entirety. No new matter is added.

The present invention is directed to the early detection of suspicious binary patterns such as viruses or malware hidden in apparently unrelated files. Using conventional methods, it is known in the art how to identify and block the transmission of the same or related files from many sources. Using conventional methods, it is known in the art how to identify and block many files transmitted from a single source or from related sources. It is the observation of the inventors that malicious binary patterns are embedded in diverse files and transmitted from many controlled sources such as a botnet in a short timeframe. Each file or binary object containing a malicious binary pattern may be made unique in an automated process and the volume from any single source can be controlled to be less noticeable.

What is needed is a way to efficiently measure binary objects such as files with unlike names, sizes, dates, sources to determine based on their contents, their similarity in binary patterns contained within.

SUMMARY OF THE INVENTION

An apparatus, system, and method for measuring the similarity of diverse binary objects, such as files, are disclosed. The method comprises determining a plurality of digital signatures in each of a plurality of dissimilar objects, for each digital signature, accessing a location in a store which has object identifiers for each object which also exhibits at least one instance of the digital signature, writing into the store the object identifiers of all the objects which have the corresponding pattern at least once and in an embodiment the number of times the pattern is found, and making a list of all the other objects which share each pattern found in a specific object. Analyzing the list determines the degree of similarity of a particular object with each of a plurality of diverse binary objects.

An embodiment of the method comprises

Determining a plurality of digital signatures of binary strings comprising a sequence of bytes or bits in at least one file;

Accessing at least one location in a data store or memory of file identifiers through a digital signature of each string; and Determining a degree of similarity among a plurality of diverse files.

In an embodiment determining a plurality of digital signatures of binary strings in at least one file comprises receiving an Nth file for pattern matching having a length of L bits, reading a string of bits or bytes of length S from the file, sweeping the string of bits or bytes through the file by discarding the first bit or byte, advancing the string and appending the next bit or byte in the file as the S bit or byte in the string.

In an embodiment determining a digital signature H for the string by applying a hash function for every S bits, whereby L-S+1 digital signatures H are determined for the file. In another embodiment, the string itself is the digital signature.

In an embodiment accessing at least one location in a data store or memory of file identifiers through a digital signature of a string comprises accessing a data store using a digital signature of a binary pattern, when no file identifier has been stored for that digital signature, writing the file identifier of the file, when at least one file identifier is stored for that digital signature, reading the file identifiers, adding the file identifier of the file and writing all the file identifiers to the store, in an embodiment, writing the number of times the digital signature occurs in the file to the store; and writing on computer readable storage or memory a list of signatures of binary patterns found in the file and the file identifiers of files found in the store having the same binary pattern and in an embodiment the number of times each binary pattern is found in each file.

In an embodiment determining a degree of similarity among a plurality of files comprises:

reading a list of signatures of binary patterns which comprise a first file, for each signature in said first file, reading the file identifiers of other files recorded with at least one matching signature, for each file, counting the number of signatures, and reporting the identities of files which have a plurality of matching signatures.

In one embodiment, the count is the lesser of the counts of those signatures, which are also found in said first file e.g. if a pattern is found twice in one file and thrice in another file, the count is 2.

DETAILED DISCLOSURE OF EMBODIMENTS OF THE INVENTION

A binary string is defined as a series of bits or bytes in the following disclosure and claims. A computer readable store may be non-volatile memory, disk file, magnetic, optical, or electronic circuits communicatively coupled to a processor.

A non-limiting exemplary embodiment applies the principles claimed to attachments to emails which may be more easily comprehended than a broader disclosure. But it is the intent of this application and claims to apply to other binary objects in addition to files attached to emails.

In the disclosure of an embodiment below, applicants may refer to a file but should be understood to mean "a non-limiting exemplary binary object such as a file".

Aspects of a file which are not required to practice the invention include but are not limited to:

Date, time, or size: It is not required to practice the invention that a binary object have a date, time, or size associated with it.

Source or destination: It is not required to practice the invention that a binary object have a source or a destination associated with it.

Headers, footers, checksums: It is not required to practice the invention that a binary object have a header, footer, or checksum.

Beginning, blocks, segmentation, or end: It is not required to practice the invention that a binary object have an identified beginning, end or internal structure. A stream such as packets being transported or a movie in mid-stream may be operated on.

It is the intent of the invention to measure similarities among binary objects which are apparently diverse according to conventional measures such as common or related sources or destinations. Files which have identical or similar meta data such as semantic or structured names, approximately related file sizes, file dates, or checksums can be determined to be similar using conventional methods known in the art.

The method receives a plurality of binary objects, such as files attached to emails, and measures similarities in binary patterns to determine for an Nth file, which of the preceding N−1 files are most similar. Various scoring methods for similarity are embodiments.

Figure 1:
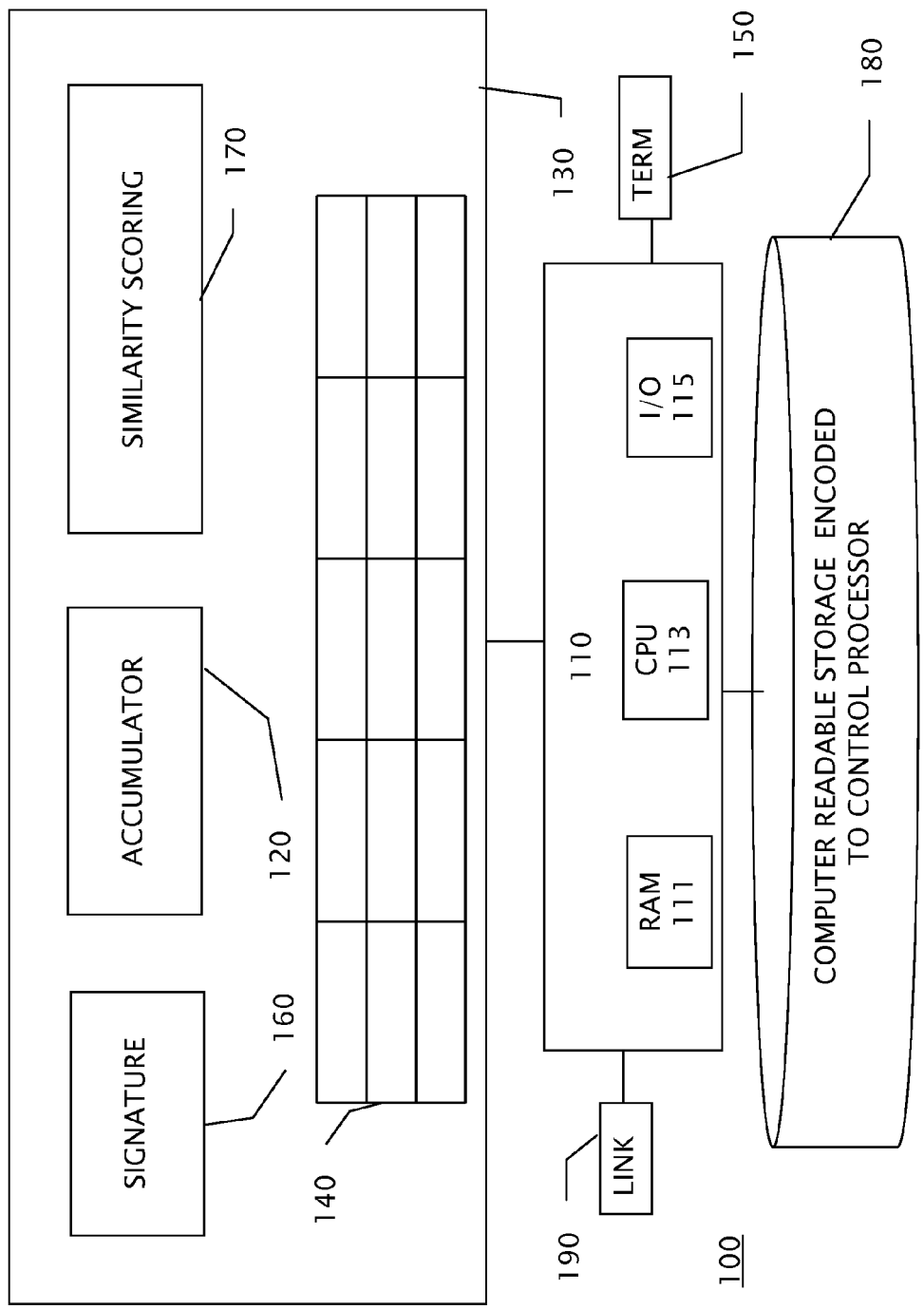
FIG. 1 is an apparatus and system block diagram.

Referring now to FIG. 1, a block diagram illustrated an apparatus and system for measuring similarity of binary objects. A processor 110 is comprised of random access memory 111, a central processing unit 113, and an Input Output controller 115. The processor is coupled to a network link circuit 190, at least one terminal 150, and computer readable storage 180 on which is encoded instructions for controlling the processor. The processor is further coupled to an apparatus 130 for determining and storing digital signatures of strings and scoring the similarity of binary objects. The apparatus 130 comprises a signature circuit 160, an accumulator 120, a similarity scoring circuit 170 and a binary object identifier store 140. It is known in the art that a circuit may be implemented as software instructions controlling a processor.

Figure 2:
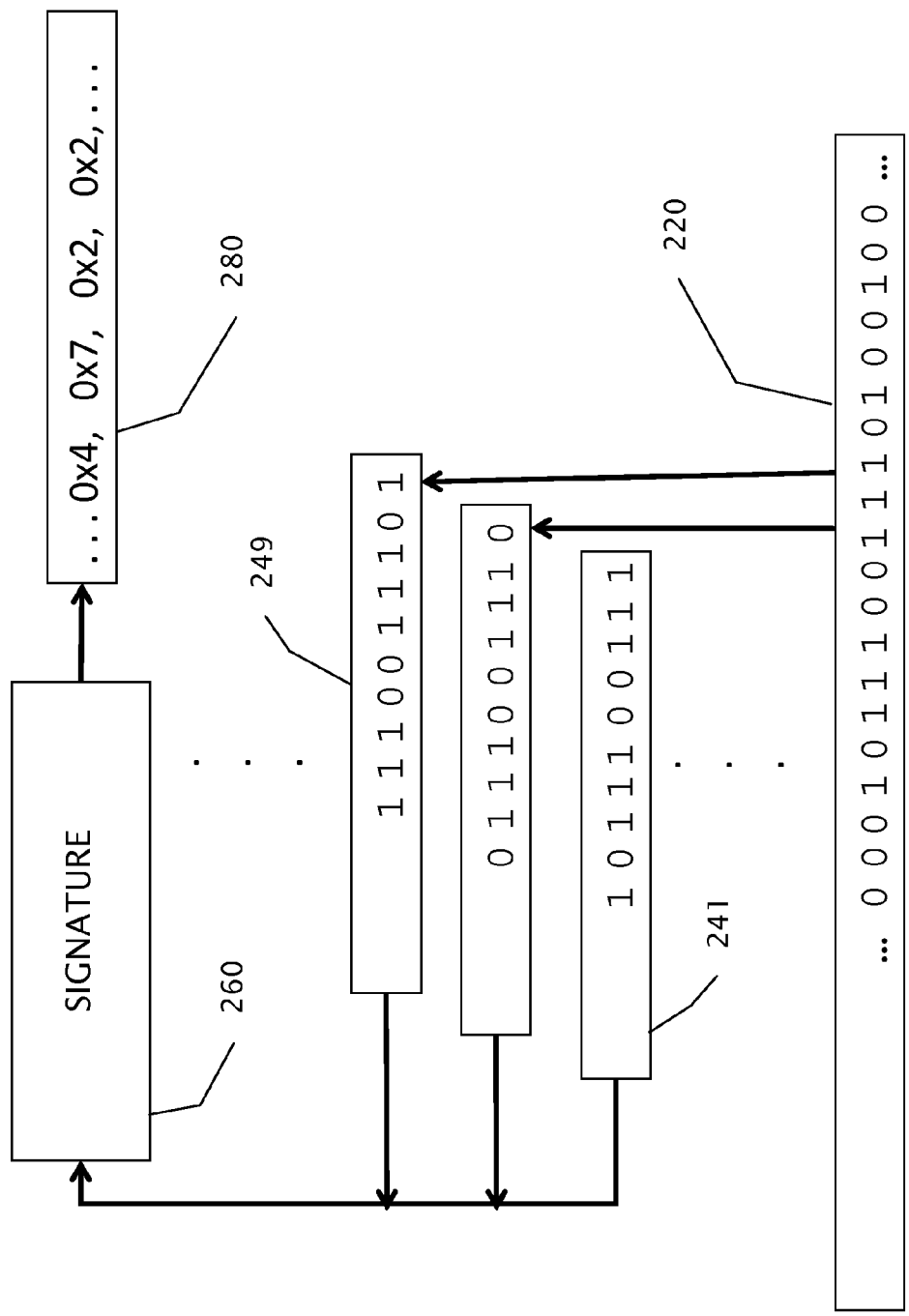
FIG. 2 is a flow chart illustrating the data flow from a binary object to through a signature circuit to a plurality of digital signatures

Referring now to FIG. 2, a portion of a binary object 220 comprises a sequential series of bits. A binary string of length S 241 is selected and presented to a signature circuit 260 which produces a signature 280. A plurality of binary strings are selected 241-249 and processed in a signature circuit 260, to generate a plurality of signatures 280. In an embodiment, the strings are determined by shifting a single bit or byte out of the string, and shifting all the remaining bits and appending the next bit or byte in the sequential series of bits or bytes. Other embodiments are shifting by other than one bit or byte. Other embodiments are skipping a fixed or variable number of bits or bytes in the sequential series of bits or bytes. Other embodiments are fixed or variable lengths to the binary string for which a signature is determined. In an embodiment the signature is a hash. In an embodiment the signature is a simple logic or mathematical operation on the binary string. In an embodiment, the signature is identical to the binary string. In an embodiment, no signature is generated for test patterns or padding. In an embodiment, padding is all ones or all zeros. In an embodiment a test pattern is a checkerboard, or alternating binary numbers such as 5s and 9s. In an embodiment the number of binary strings is equal to the number of bits in the series minus the length of the string plus 1. In an embodiment the number of binary strings is equal to the number of bytes in the series minus the length of the string plus 1.

In an embodiment, the signature circuit sweeps through the binary object determining a digital signature for every binary string of length S.

Figure 3:
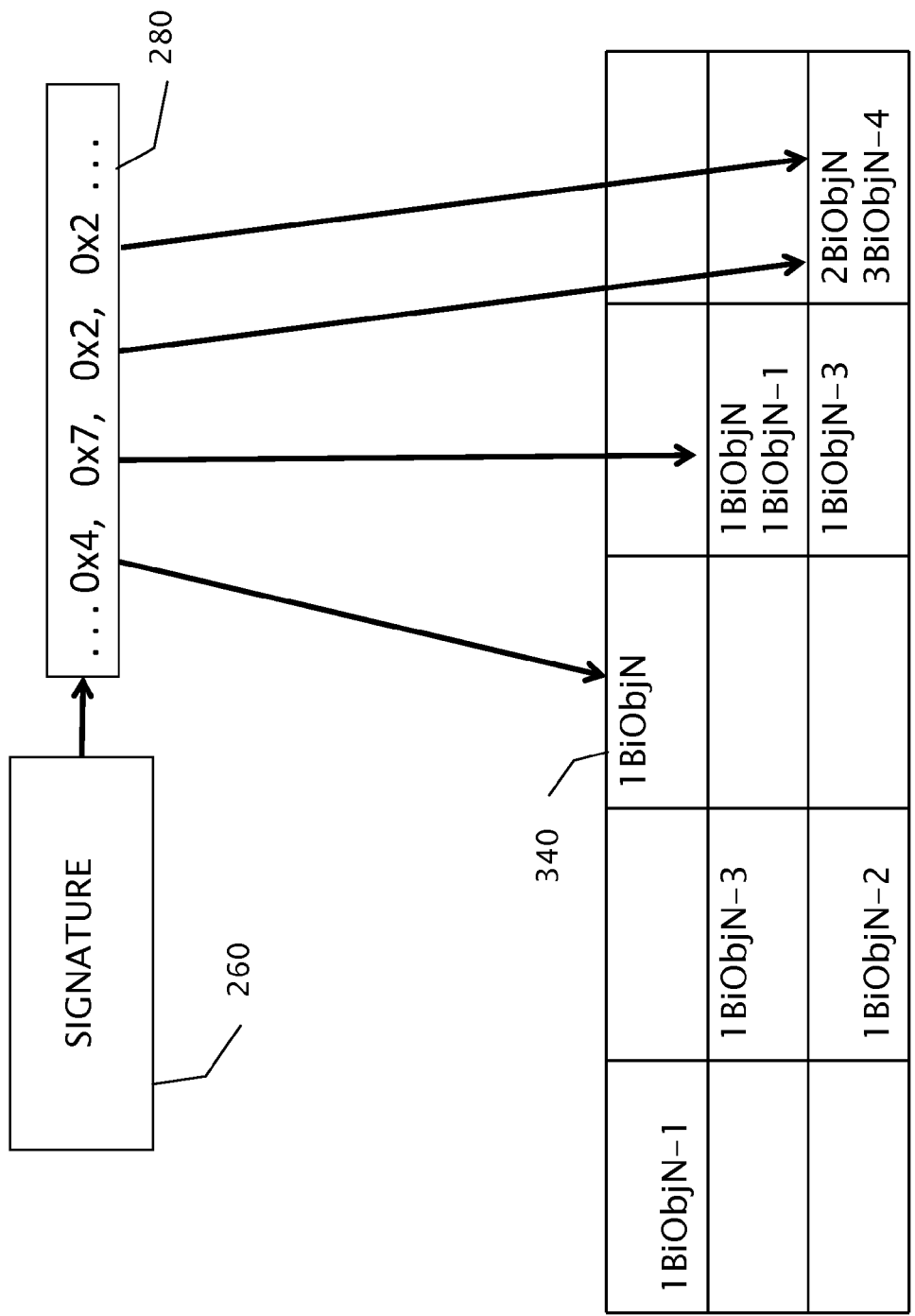
FIG. 3 is a flow chart illustrating the data flow from a signature circuit to a database of Binary Object Identifiers.

Referring now to FIG. 3, the signatures 280 generated by a signature circuit 260 control access into a store 360 which contains identifiers for binary objects (such as files attached to emails) and, optionally, counts. In an embodiment a signature is used to generate a storage location in a store which may be read from or written to. In an embodiment shown in FIG. 3, each time a signature is generated for Binary Object N, the location is read, the identifier for Binary Object N is incremented if previously stored or added if not previously stored and the resulting count for the signature is written into the location of the store 360. A non-limiting exemplary two dimensional array is shown as an illustration for ease of communication. In an embodiment, the signatures are selected to widely distribute over a range of storage locations. In an embodiment the signatures are selected to substantially compress data with a low probability of aliasing. If the same pattern is frequently repeated in a binary object, an optimization is provided. In the non-limiting exemplary illustration BiObjN, BiObjN−1, BiObjN−2 are simply unique identifiers for each binary object. The prefixes show the number of times a pattern has been found with each binary object. The pattern 0x2 has been found three times in BiObjN−4. Each pattern has a location in the store and each location has the number if repetitions of each pattern in each binary object.

Figure 4:
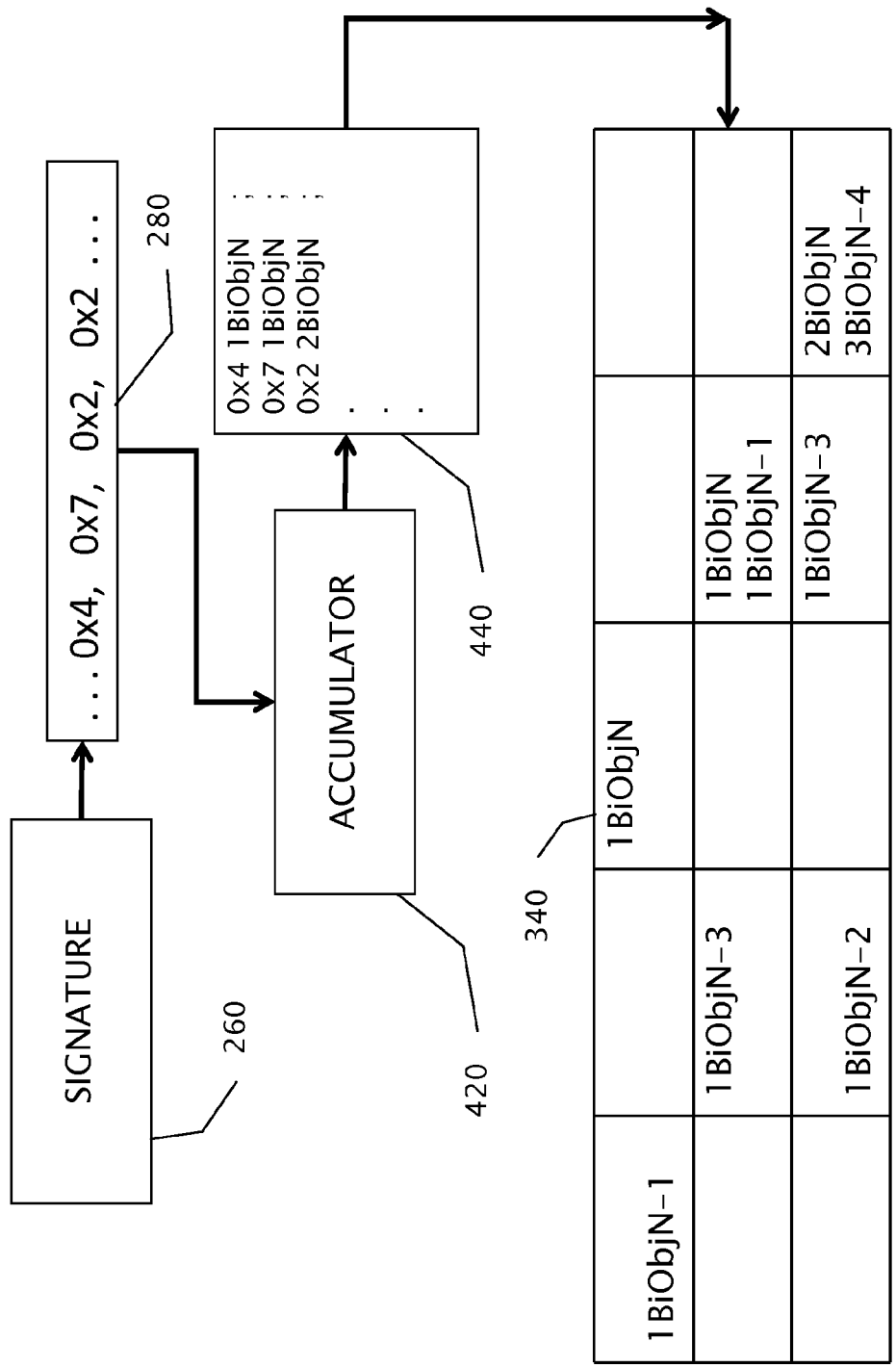
FIG. 4 is a flow chart illustrating the data flow from a signature circuit to a database of Binary Object identifiers with an optimization of adding an accumulator circuit.

Referring now to FIG. 4, in an embodiment an accumulator 420 receives digital signatures 280 from the signature circuit 260. For each digital signature, the accumulator counts the number of times each pattern repeats. The count for each pattern 440 is used to update a store 340. In this optimization, each location of the store is accessed at most once for each binary object. In an embodiment each repetition of a binary pattern results in a unique signature. In an embodiment, repetitions of a binary pattern are not recorded. In an embodiment, the absolute or relative position of patterns and repetitions are recorded.

Figure 5:
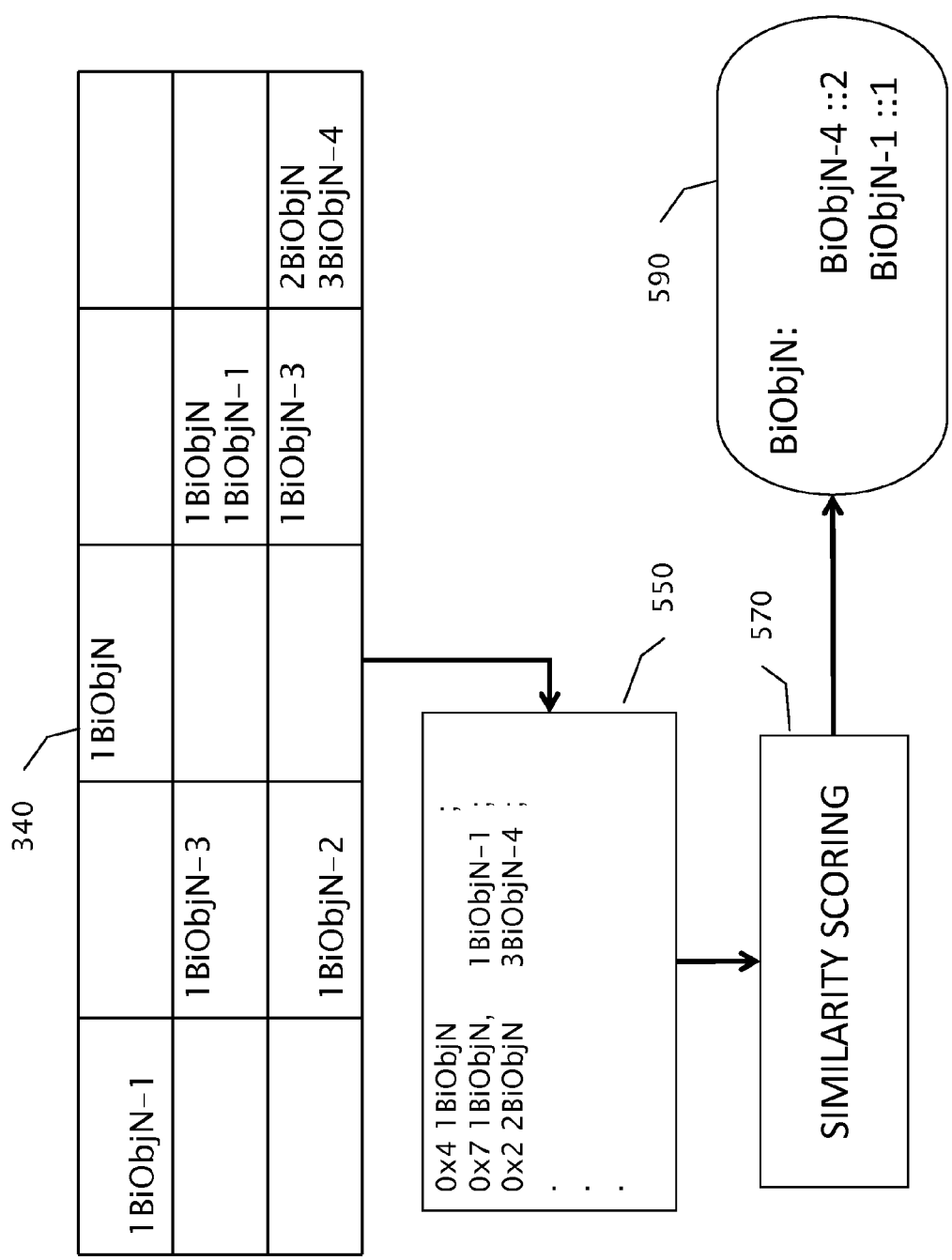
FIG. 5 is a flow chart illustrating the data flow from a accessing a database of binary object identifiers to a report of similarity scoring.

Referring now to FIG. 5, in an embodiment, when the count for each pattern is updated to the store 340, an additional step is to read out the count for other binary objects which have included said pattern. A list 550 can be compiled which contains the patterns found in a binary object, the number of times each pattern was found in the binary object, other binary objects containing those patterns and the number of times those patterns occurred in those other binary objects. In an embodiment a similarity scoring circuit 570 determines the measure of similarity of the latest binary object with every other binary object in store 340. In an embodiment the number of unique patterns in the latest binary object which are found in an other binary object is the score. In an embodiment, the number of repetitions of a unique pattern adds an additional count to the score. In an embodiment if the number of repetitions in the latest binary object is not equal to the number of repetitions in an other file, the score is improved by the lower of the two repetitions. As a non-limiting exemplary scoring method, see that the pattern 0x2 occurs twice in Binary Object N and thrice in Binary Object N−4. The exemplary report 590 from the similarity scoring circuit 570 shows that the similarity score for BiObjN and BiObjN−4 is 2. Other similarity scoring methods may fractionally improve a score for repetition. Other similarity scoring methods may multiplicatively improve a score for repetition. Other similarity scoring methods simply track if a pattern is present or absent. In an embodiment, an exact match in the number of repetitions may be more significant and receive a higher score. In an embodiment the similarity scoring process can occur as each location is updated for the latest binary object processed. In an embodiment, the similarity scoring process can occur for all the locations in the store as a scheduled process. In an embodiment a similarity scoring method reads the absolute or relative position of a pattern within a binary object such as within the first 2 Megabytes, or within the first 20 percent of a data stream. In an embodiment, each pattern may be scored according to the number of binary objects in which it is found.

In an embodiment, the invention comprises determining a plurality of digital signatures of binary strings in each binary object by:
receiving an Nth binary object for pattern matching having a length of L bits or bytes,
reading a binary string of length S from the binary object,
determining a digital signature H for the binary string, and
selecting a plurality of other binary strings in the binary object and determining a digital signature for each binary string.

In an embodiment, the invention comprises accessing at least one location in a data store of binary object identifiers through a digital signature of a binary string by:
accessing a data store using a digital signature of a binary pattern, when no binary object identifier has been previously stored for that digital signature,
writing an identifier of the binary object,
when at least one identifier is stored for that digital signature, reading the identifiers, adding the identifier of the file and writing all the identifiers to the store
writing the number of times the digital signature occurs in the binary object to the store; and
writing on computer readable memory or store a list of signatures of binary patterns found in the binary object and the identifiers found in the store having the same binary pattern and the number of times each binary pattern is found in each binary object.

In an embodiment, the invention comprises determining a degree of similarity among a plurality of binary objects by:
reading a list of signatures of binary patterns which comprise a binary object, for each signature, counting each binary object found in a store with at least one matching signature,
for each signature which is found a plurality of times in the binary object, counting each binary object found in a store with the same plurality of signatures, and
reporting the identities of at least one binary object which has a plurality of matching signatures according to the highest counts.

Conclusion

In an embodiment the invention comprises a method for measuring similarity of the contents of a plurality of binary objects comprising: determining a plurality of digital signatures of binary strings in each binary object;
accessing at least one location in a data store of binary object identifiers through a digital signature of a binary string; and
determining a degree of similarity among a plurality of binary objects.

The present invention may be easily distinguished from source code control methods because it does not compare a known derivative file with a known antecedent file. The present invention may be easily distinguished from storage, archiving, and deduplication methods because it can measure similarity among such diverse binary objects as data streams, images, music and video streams, and web pages. The present invention may be easily distinguished from conventional block lists because it does not depend on meta data such as source or destination Internet Protocol addresses, message digests, file checksums, file names, dates, timestamps or internal structure such as headers.

As indicated herein, embodiments of the present invention may be implemented in connection with special purpose or general purpose computers. Embodiments within the scope of the present invention also include computer-readable storage or memory for carrying or having computer-executable instructions or electronic content structures stored thereon, and these terms are defined to extend to any such non-transitory media or instructions that are used with digital devices.

By way of example such computer-readable storage or memory can comprise RAM, ROM, flash memory, EEPROM, CD-ROM or other optical disk storage, magnetic disk storage or other magnetic storage devices, or any other non-transitory medium which can be used to carry or store desired program code in the form of computer-executable instructions or electronic content structures and which can be accessed by a general purpose or special purpose computer, or other computing device.

Computer-executable instructions comprise, for example, instructions and content which cause a general purpose computer, special purpose computer, special purpose processing device or computing device to perform a certain function or group of functions.

Although not required, aspects of the invention have been described herein in the general context of computer-executable instructions, such as program modules, being executed by computers in network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

The described embodiments are to be considered in all respects only as exemplary and not restrictive. The scope of the invention is, therefore, indicated by the appended claims rather than by the foregoing description. All changes which come within the meaning and range of equivalency of the claims are to be embraced within their scope.

The invention claimed is:

1. A system for measuring potential similarity of apparently diverse binary objects comprises:
a reporting module which counts number of locations of a non-transitory computer-readable similarity store wherein the non-transitory computer-readable similarity store contains object identifiers of two apparently dissimilar binary objects as a measure of relative similarity;
the non-transitory computer-readable similarity store which contains the object identifiers of any binary object which contains a string which has a pattern corresponding to a location;
a receiving module which deduplicated binary objects which are similarly in any one of name, size, checksum, date, time, source, or destination;
a string selection module which selects comparable strings from each of N binary objects;
a signature determination module which determines a pattern signature for each string selected from the N binary objects;
a similarity store access module which reads from and writes to the location of the non-transitory computer-readable similarity store according to the pattern signature determined from a selected string;
a processor and memory containing executable instructions wherein the processor controls the system to write an object identifier into the location of the non-transitory computer-readable similarity store determined by the pattern signature for each string selected from each of N binary objects, wherein N is an integer number greater than three;
wherein the non-transitory computer-readable similarity store accumulates binary strings and a count of reoccurrence of each of the binary strings in a binary object, wherein the number of binary strings in each binary object is equal to the number of bits or bytes in the binary object minus a length of the binary string plus 1.

2. An apparatus for reporting similarity among N diverse binary objects comprising:
- a non-transitory computer-readable similarity store configured to store object identifiers for the N diverse binary objects at locations corresponding to a pattern in a binary string selected from the N diverse binary objects, wherein N is an integer number greater than three;
- a signature circuit which transforms a selected binary string to a pattern signature and determines a location of the non-transitory computer-readable similarity store;
- a binary string selection circuit which sweeps a sequential range of bits or bytes through a binary object to select a plurality of binary strings from the binary object for the signature circuit to generate pattern signatures; and
- a non-transitory data store coupled to the processor to accumulate the binary strings and a count of reoccurrence of each of the binary strings in the binary object, wherein the number of binary strings in the binary object is equal to the number of bits or bytes in the binary object minus a length of the binary string plus 1.

3. The apparatus of claim 2 wherein the signature circuit provides a logical or mathematical transform of the binary string.

4. The apparatus of claim 2 wherein a signature is hash computed on the binary string.

5. The apparatus of claim 2 wherein a signature is the binary string itself.

6. The apparatus of claim 2 further comprising a similarity score reporting circuit configured to determine a number of unique patterns in the latest binary object which are found in another binary object, a number of repetitions of one of the unique patterns as an additional count, and if the number of repetitions in the latest binary object is not equal to the number of repetitions in another file, a similarity score is improved by the lower of the two repetitions.

7. A method for operation of an apparatus to report on similarity of diverse binary objects, the method comprising:
- reading a plurality of locations of a non-transitory computer-readable similarity store, wherein the non-transitory computer-readable similarity store contains object identifiers of binary objects which contain a string which has a pattern corresponding to one of the locations;
- deduplicating the binary objects which are similarly in any one of name, size, checksum, date, time, source, or destination;
- selecting comparable strings from each of the binary objects;
- determining a pattern signature for each string selected from the binary objects;
- reporting the number of locations which contain object identifiers of two apparently dissimilar binary objects determined by the pattern signature as a measure of their relative similarity to each other; and
- accumulating binary strings and a count of reoccurrence of each of the binary strings in one of the binary objects, wherein the number of binary strings in the binary object is equal to the number of bits or bytes in the binary object minus a length of the binary string plus 1.

8. The method of claim 7 further comprising:
- writing an object identifier of an Nth dissimilar binary object to a location of the non-transitory computer-readable similarity store corresponding to a pattern signature.

9. The method of claim 8 further comprising:
- accessing the location of the non-transitory computer-readable similarity store which has object identifiers for each of the previous N−1 dissimilar binary objects which contain the corresponding pattern in a string selected from the dissimilar binary objects.

10. The method of claim 9 further comprising:
- determining at least one digital signature for a binary string in an Nth dissimilar binary object, and
- determining a location of similarity store by transforming each digital signature.

11. The method of claim 10 wherein determining a digital signature for at least one binary string in each binary object comprises:
- receiving a binary object for pattern matching,
- reading the at least one binary string from the binary object,
- determining a digital signature H for the binary string, and
- selecting a plurality of other binary strings in the binary object, and
- determining a digital signature for each binary string.

12. The method of claim 9 further comprising:
- reading a list of signatures of the binary strings which comprise a binary object,
- retrieving the object identifiers stored at the locations of similarity store corresponding to the list of signatures, and
- reporting the identities of binary objects which have a plurality of matching signatures.

* * * * *